US008924548B2

(12) United States Patent
Frost et al.

(10) Patent No.: US 8,924,548 B2
(45) Date of Patent: Dec. 30, 2014

(54) INTEGRATED ASSET TRACKING, TASK MANAGER, AND VIRTUAL CONTAINER FOR DATA CENTER MANAGEMENT

(75) Inventors: James D. Frost, Naperville, IL (US); Brendan F. Doorhy, Westmont, IL (US); Thomas F. Lukareski, New Lenox, IL (US); Zeshun Cai, Skokie, IL (US); Guy M. Panozzo, Tinley Park, IL (US)

(73) Assignee: Panduit Corp., Tinley Park, IL (US)

( * ) Notice: Subject to any disclaimer, the term of this patent is extended or adjusted under 35 U.S.C. 154(b) by 162 days.

(21) Appl. No.: 13/586,569

(22) Filed: Aug. 15, 2012

(65) Prior Publication Data
US 2013/0046884 A1    Feb. 21, 2013

Related U.S. Application Data

(60) Provisional application No. 61/524,035, filed on Aug. 16, 2011.

(51) Int. Cl.
*G06F 15/16* (2006.01)
*G06F 15/173* (2006.01)
*G06F 9/06* (2006.01)
*G06F 3/00* (2006.01)
*G06Q 10/08* (2012.01)

(52) U.S. Cl.
CPC .. *G06F 9/06* (2013.01); *G06F 3/00* (2013.01); *G06Q 10/087* (2013.01)
USPC ........... 709/224; 709/219; 709/223; 709/231; 709/238

(58) Field of Classification Search
CPC ... H04L 29/08072; H04L 29/06; H04L 43/00; H04L 12/2602; H04L 41/22; G06F 9/06; G06Q 10/087
USPC .......................................... 709/224
See application file for complete search history.

(56) References Cited

U.S. PATENT DOCUMENTS

| | | |
|---|---|---|
| 3,739,329 A | 6/1973 | Lester |
| 4,636,950 A | 1/1987 | Caswell et al. |
| 4,852,001 A | 7/1989 | Tsushima et al. |
| 4,862,160 A | 8/1989 | Ekchian et al. |
| 5,016,170 A | 5/1991 | Pollalis et al. |
| 5,182,705 A | 1/1993 | Barr et al. |
| 5,434,775 A | 7/1995 | Sims et al. |
| 5,471,617 A * | 11/1995 | Farrand et al. ................ 718/100 |
| 5,588,005 A | 12/1996 | Ali et al. |
| 5,633,875 A | 5/1997 | Hershey et al. |
| 5,661,457 A | 8/1997 | Chaffari et al. |
| 5,686,888 A | 11/1997 | Welles, II et al. |
| 5,708,423 A | 1/1998 | Ghaffari et al. |
| 5,949,335 A | 9/1999 | Maynard |
| 6,101,481 A | 8/2000 | Miller |
| 6,108,524 A | 8/2000 | Hershey et al. |
| 6,222,908 B1 | 4/2001 | Bartolutti et al. |
| 6,237,051 B1 | 5/2001 | Collins |
| 6,324,213 B1 | 11/2001 | Harrison |

(Continued)

*Primary Examiner* — Tauqir Hussain
(74) *Attorney, Agent, or Firm* — Christopher S. Clancy; Yuri Astvatsaturov

(57) ABSTRACT

The present invention provides for the integration of a an infrastructure management software (IMS) asset tracking system, an IMS task manager (ITM) and an IMS virtual container or virtual container feature to alleviate issues such as personnel scheduling issues, lost asset issues and service outages within a data center.

9 Claims, 13 Drawing Sheets

(56) References Cited

U.S. PATENT DOCUMENTS

| | | |
|---|---|---|
| 6,344,794 B1 | 2/2002 | Ulrich et al. |
| 6,357,662 B1 | 3/2002 | Helton et al. |
| 6,425,006 B1 * | 7/2002 | Chari et al. ............... 709/224 |
| 6,445,968 B1 | 9/2002 | Jalla |
| 6,462,656 B2 | 10/2002 | Ulrich et al. |
| 6,507,869 B1 | 1/2003 | Franke et al. |
| 6,669,089 B2 | 12/2003 | Cybulski et al. |
| 6,738,628 B1 | 5/2004 | McCall et al. |
| 6,825,763 B2 | 11/2004 | Ulrich et al. |
| 6,934,540 B2 | 8/2005 | Twitchell, Jr. |
| 6,975,222 B2 | 12/2005 | Krishan et al. |
| 6,977,612 B1 | 12/2005 | Bennett |
| 7,027,919 B2 | 4/2006 | Bernesi et al. |
| 7,030,022 B2 | 4/2006 | Jung et al. |
| 7,040,050 B2 | 5/2006 | Skinner |
| 7,072,668 B2 | 7/2006 | Chou |
| 7,102,565 B2 | 9/2006 | Jesson |
| 7,124,101 B1 | 10/2006 | Mikurak |
| 7,138,913 B2 | 11/2006 | Mackenzie et al. |
| 7,171,187 B2 | 1/2007 | Haave et al. |
| 7,256,681 B1 | 8/2007 | Moody et al. |
| 7,265,668 B1 | 9/2007 | Brosius |
| 7,277,048 B2 | 10/2007 | Hessing |
| 7,315,281 B2 | 1/2008 | Dejanovic et al. |
| 7,424,473 B2 | 9/2008 | Orton, III et al. |
| 7,436,303 B2 | 10/2008 | Tourrilhes et al. |
| 7,440,848 B2 | 10/2008 | Anderson |
| 7,504,949 B1 | 3/2009 | Rouaix et al. |
| 7,545,266 B2 | 6/2009 | Brosius |
| 7,606,288 B2 | 10/2009 | Prestwich et al. |
| 7,627,660 B2 * | 12/2009 | Naitoh ...................... 709/223 |
| 7,639,144 B2 | 12/2009 | Kapsambelis et al. |
| 7,646,295 B1 | 1/2010 | Rana et al. |
| 7,768,393 B2 | 8/2010 | Nigam |
| 7,787,409 B2 | 8/2010 | Sanderford, Jr. |
| 7,801,506 B2 | 9/2010 | Haave et al. |
| 7,827,201 B1 | 11/2010 | Gordon et al. |
| 7,830,852 B2 | 11/2010 | Twitchell, Jr. |
| 7,843,335 B2 | 11/2010 | Furey et al. |
| 7,898,388 B2 | 3/2011 | Ehrman et al. |
| 7,898,411 B2 | 3/2011 | Brosius |
| 7,924,153 B1 | 4/2011 | Furey et al. |
| 7,965,181 B2 | 6/2011 | Rana et al. |
| 7,966,105 B2 | 6/2011 | McAden |
| 2001/0029474 A1 * | 10/2001 | Yada .............................. 705/28 |
| 2002/0111819 A1 * | 8/2002 | Li et al. ......................... 705/1 |
| 2003/0093521 A1 * | 5/2003 | Schlonski et al. ............. 709/224 |
| 2003/0140150 A1 | 7/2003 | Kemp et al. |
| 2003/0154199 A1 * | 8/2003 | Thomas et al. ................. 707/10 |
| 2003/0154404 A1 * | 8/2003 | Beadles et al. ................ 713/201 |
| 2003/0165230 A1 * | 9/2003 | Reuss ...................... 379/265.02 |
| 2005/0076034 A1 | 4/2005 | Addonisio et al. |
| 2006/0074618 A1 | 4/2006 | Miller et al. |
| 2007/0043538 A1 | 2/2007 | Johnson et al. |
| 2007/0233838 A1 | 10/2007 | Takamoto et al. |
| 2009/0055507 A1 | 2/2009 | Oeda |
| 2009/0108995 A1 | 4/2009 | Tucker et al. |
| 2009/0189767 A1 | 7/2009 | Primm et al. |
| 2009/0228967 A1 | 9/2009 | Gbadegesin et al. |
| 2010/0115509 A1 | 5/2010 | Kern et al. |
| 2010/0210135 A1 | 8/2010 | German et al. |
| 2010/0251328 A1 | 9/2010 | Syed et al. |
| 2011/0035494 A1 | 2/2011 | Pandey et al. |
| 2011/0047263 A1 | 2/2011 | Martins et al. |
| 2012/0271472 A1 * | 10/2012 | Brunner et al. ............... 700/295 |

\* cited by examiner

INTEGRATED ASSET TRACKING, TASK MANAGER, AND VIRTUAL CONTAINER FOR DATA CENTER MANAGEMENT

CROSS-REFERENCE TO RELATED APPLICATIONS

The present application claims priority to U.S. Provisional Patent Application No. 61/524,035, filed on Aug. 16, 2011.

TECHNICAL FIELD

The present invention generally relates to asset management and tracking, and more specifically to applications and systems for management and tracking of telecommunication equipment in a data center.

BACKGROUND

A data center is a facility used to house a network of computer systems and associated components, such as telecommunications and storage systems. In addition to that equipment, the data center may include redundant or backup power supplies, redundant data communications connections, environmental controls (e.g., air conditioning, fire suppression) and security devices. Typically, the data center is managed by a data center manager (DCM) who may need to add, move, or decommission expensive data equipment on an hourly/daily/weekly basis. The highly dynamic environment of the data center routinely may cause personnel scheduling issues, lost asset issues, and service outages. Therefore, it would be desirable to alleviate the issues caused by the highly dynamic environment of the data center and to simplify the workflow for the DCM.

SUMMARY OF THE INVENTION

Accordingly, the present invention may help to assist the DCM with a highly dynamic environment of the data center and to simplify the workflow In one embodiment, the present invention is an asset tracking system which includes the integration of an Infrastructure Management Software (IMS) such as Panduit's Physical Infrastructure Manager, a task manager, and a virtual container or virtual container feature. An IMS is a generally a software application that can facilitate the recording, tracking, and management of data center equipment.

In another embodiment, the present invention can give the DCM the ability to track the whereabouts of equipment in the network along with equipment's connectivity to that network. The virtual container can allow the DCM to graphically represent the network equipment in a way that is desirable to the DCM. The graphical representation provided by the virtual container could provide a representation of the network equipment, for example by location, by equipment type, and/or by product line.

In another embodiment, when the IMS, the task manager, and the virtual container are combined into an integrated system for data center management, the system of the present invention can provide the DCM the ability to schedule when network equipment is added/moved/removed and also identify where the equipment will be located, how it will be connected or disconnected from the network, and/or who will do the work.

In another embodiment, the present invention includes asset tracking reconciliation, which gives the DCM the ability to accept or reject changes made to the trackable assets by technicians. Through reconciliation, the DCM is given the means to verify that the work is done properly and the DCM is also given the opportunity to approve or reject the work. If the DCM accepts the change made by the technician, the asset information is changed in an IMS database. If the DCM rejects the change, the asset information remains as unchanged.

A system according to the present invention may provide the DCM with real-time knowledge of where data center equipment is located and if or when the equipment is being worked on. Additionally, the present invention may provide the DCM with the ability to track the whereabouts of each piece of equipment in the network, and within the data center, along with each piece of equipment's connectivity to the rest of the network.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 2 depicts an update asset view from an IMS asset tracking system.

FIG. 3 depicts a remove asset view from an IMS asset tracking system.

FIG. 4 depicts a reconciliation of asset view from an IMS asset tracking system.

DETAILED DESCRIPTION

Figure 1:
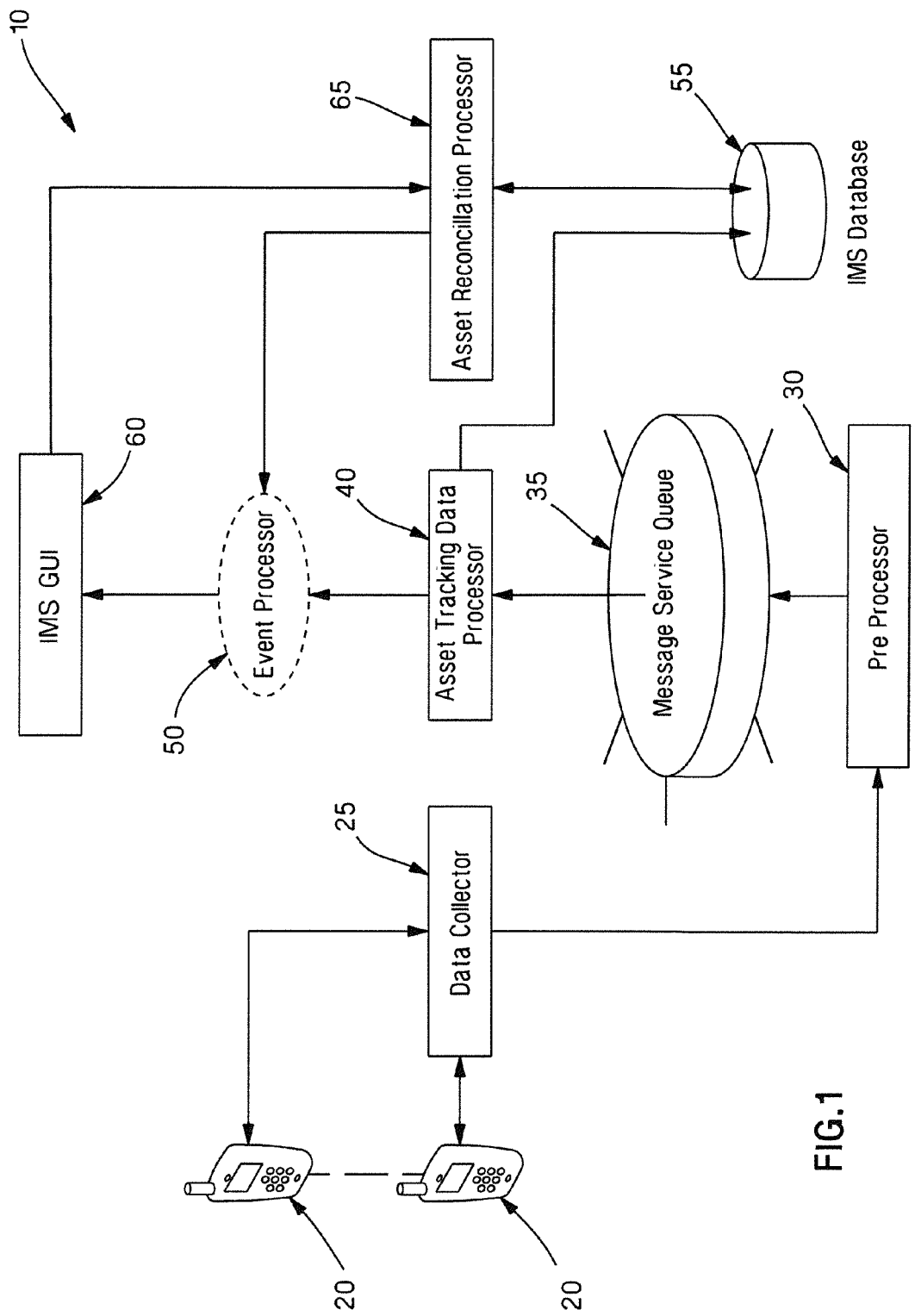
FIG. 1 depicts a flow chart illustrating architecture for an asset tracking system according to one embodiment of the present invention using data collection devices.

As used herein, the term "asset tracking" refers to the awareness of the physical location of an individual device. Asset tracking does not necessarily imply asset management; thought the two terms may be used interchangeably. Assets may be any piece of equipment found in a data center, including, but not limited to: network equipment such as cabling, switches, routers, patch panels, computer systems, communications devices, power supplies, and modems; and infrastructure such as cabinets, racks, cable ties, communications outlets, and power outlets.

The tracking system of the present invention can allow a user to select, specify, and track attributes related to automatically discovered assets through IMS discovery and manually discovered assets. An asset is considered to be automatically discovered if the asset is classified as an on-network asset and the asset has been present while a network discovery process was running. The tracking system becomes aware of this class of asset through active actions (e.g. IMS network discovery mechanism, manual or scheduled). An asset is considered manually discovered if the awareness of the asset can only be determined when a technician communicates status changes to the tracking system. The tracking system becomes aware of this class of assets through external means (e.g. data entry via a data entry device). The asset tracking process may also be semi-automated, requiring a user to manually enter attribute information, manually validate asset location, and establish connectivity. In addition, the asset tracking process supports the use of data entry device(s) that allow a user to detect and read asset identifying information such as asset tags to reduce data entry time and improve accuracy. Data entry devices may include any device through which information can be captured or input, such as RFID (radio frequency identification) readers, bar code readers, keyboards, mice, scanners, and/or cameras. Once initial validations are complete, the tracking system will track automatically discovered asset movement across the network, including all asset information previously specified. A process using policy enforcement and data entry devices supports semi-automatically tracking manually discovered asset movement.

A tracking system according to the present invention may include an Asset Tracking 2.0 Policy which introduces an additional method or tagging system that incorporates ID tags (e.g., barcode or RFID) and data entry devices (e.g., barcode scanners or RFID scanners) to discover and track assets throughout their life cycle within the data center. This tagging system allows for the formation of reliable and unique association between asset data and physical objects associated with the asset data. Using appropriate data entry devices, a tagged asset can be accurately identified, added to the tracking system, and tracked without requiring network connection. As a result, even if an asset is not attached to or connected with the network, certain key asset data can still be gathered and presented to the tracking system of the present invention. The tagging system allows for the addition of assets, and the detection of discrepancy between the asset data and the physical object for non-networking assets. This tagging system expands the scope and categories of assets that may be tracked by the tracking system. In addition, the tagging system enables DCMs to inventory assets at the earliest opportunity (e.g., upon initial possession of assets). The tagging system also supports the capabilities to flag discrepancies between the asset data and device data, which is data generated by a data entry device when reading an ID tag, and to provide a function to guide authorized personnel to reconcile any discrepancies. Authentications and authorizations are also supported by the tracking system of the present invention to insure that asset activities are properly conducted by the authorized personnel. The Asset Tracking 2.0 Policy does not stipulate fixed procedures upon users. Rather, the Asset Tracking 2.0 Policy offers a set of configurable facilities with which users may use to form policies that meet their own practices and needs in adding and tracking assets.

Figure 2:
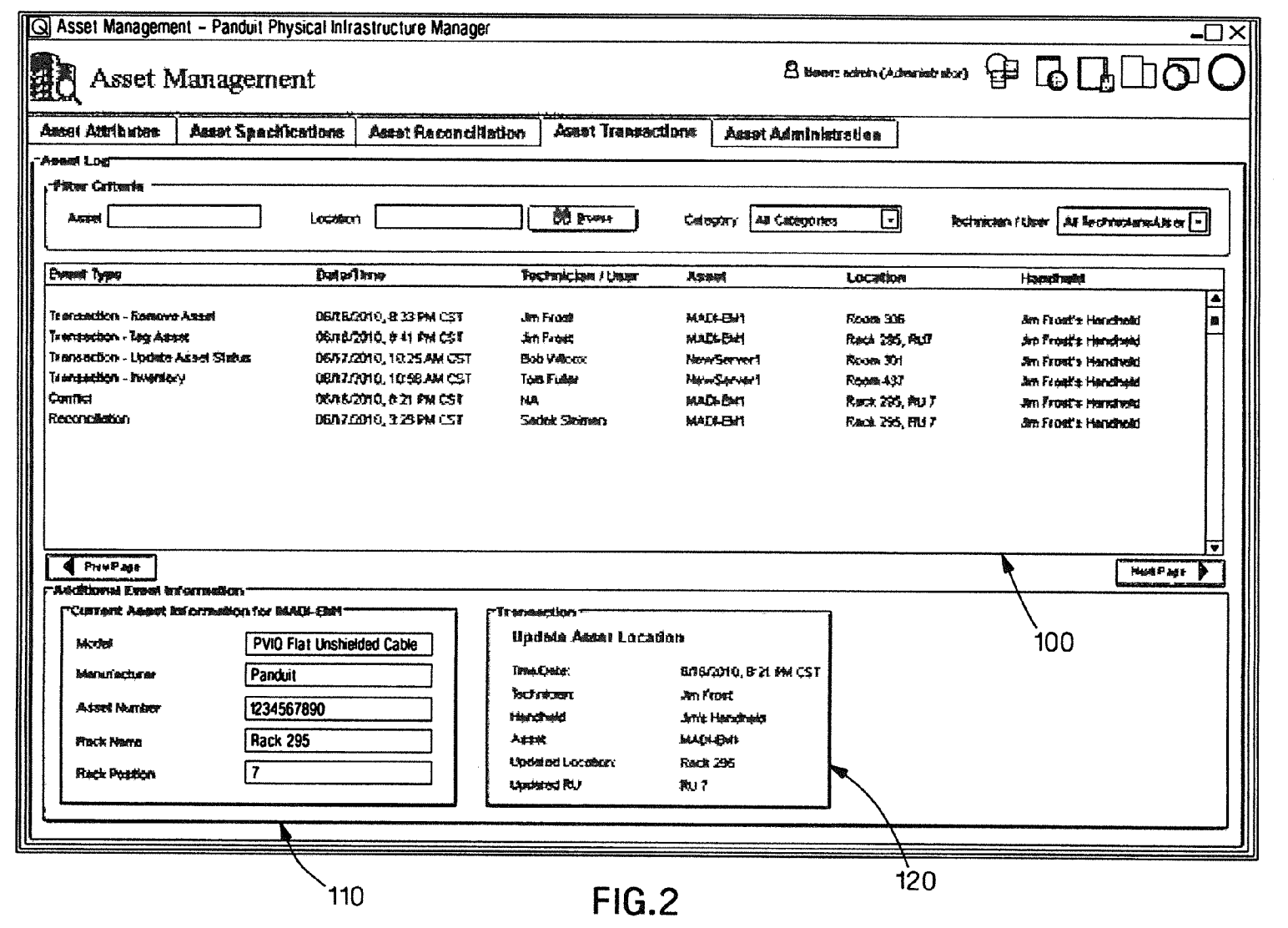

The workflow of a system 10 according to one embodiment of the present invention is illustrated in FIG. 1. A DCM or any other user employs data entry devices 20 to collect asset tracking (AT) data. This data is collected by an asset tracking data collector 25, which at least in part facilitates the transfer of said data to the IMS. The data collector may include both, software and hardware aspects. The data is then received by a pre-processor 30 which formats the collected data in preparation for placing it into a message service queue 35. From this queue 35, an asset tracking data processor 40 evaluates the queued data and forwards it to the event processor 50 along with an IMS database 55. When data is received by an even processor 55, it is then formatted and outputted on a graphical user interface (GUI) 60, an example of which is illustrated in FIG. 2. At the same time, the asset reconciliation processor 60 checks the database 55 against an event and if a conflict arises, the processor 65 forwards corresponding data to the event processor 50 to be made visible through the GUI 60.

To add one or more new assets to the tracking system of the present invention, the following preconditions and events, preferably take place: 1) preferably all data reconciliation will be done at the IMS; 2) the data entry device uses a software application to collect key asset data; 3) the data entry device has a method to communicate with the IMS (online/offline); 4) assets are not tagged; 5) a technician or user has a set of pre-printed tags at hand (e.g., tags are printed by a printer or a data entry device); and 6) all rooms/locations within the data center are labeled with tags.

The events for adding one or more new assets to the tracking system preferably occur in the following sequence: 1) the technician enters a room with a proper credential; 2) the technician signs-in to the data entry device with credentials and the credentials are accepted; 3) the technician selects the room location with the data entry device; 4) for each asset, the technician picks a tag and affixes it to the asset following predetermined recommendation for size and placement; 5) the technician then scans the asset tag with the data entry device; 6) the technician enters additional data into the data entry device (e.g., MAC (media access control), rack, RU (rack unit), UPC (universal product code), serial number, model, vendor), preferably, as much data as available from the asset; 7) the technician repeats steps 4 through 6 until all relevant assets are tagged and scanned; 8) actions taken by the technician are logged into the system or data entry device (e.g., the selected option, the person performing the reconciliation, and timestamps); 9) the technician instructs the data entry device that the technician is done collecting data, when done; and 10) the data entry device communicates or transports the collected data to the tracking system, which preferably resides in a remote server or remote computer system.

After a new asset is added into the tracking system, the newly discovered asset is then updated within the tracking system. In order to update a single newly discovered asset in the tracking system, the following preconditions and events, preferably take place: 1) all data reconciliation needs to be done at the tracking system; 2) the data entry device has a software application used to collect key asset data; 3) the data entry device has a method to communicate with the tracking system (online/offline); 4) the asset is on a rack and is untagged; 5) the tracking system has discovered the asset; 6) the technician has a set of pre-printed tags at hand (e.g., tags are printed by a printer or a data entry device); 7) the building, room, and rack within the data center are labeled with asset tags.

The events for updating an asset within the tracking system preferably occur in the following sequence: 1) the technician enters the room with proper credential; 2) the technician signs-in on to the data entry device with credential and is accepted; 3) the technician selects the room location; 4) the technician visually searches and finds the asset; 5) the technician picks a tag and affixes it to the asset following predetermined recommendation for size and placement; 6) if asset data is input manually, then the following manual data entry method occurs: a) the technician scans the rack location with the data entry device where the asset was found, b) the technician enters the RU level of the asset into the data entry device, c) the technician scans the asset tag with the data entry device, d) the technician enters additional data into data entry device (e.g., MAC, rack, RU, UPC, serial number, model, vendor) as much data as available from the asset; 7) if data is not input manually, but rather automatically, then the facilitated entry method occurs: a) the tracking system assumes that asset information has been entered previously, b) a report is generated that contains a temporary tag for the asset, c) the technician scans the temporary tag on a printed version of the generated report or the GUI (graphical user interface), d) the technician scans a bar code, or other identifying mark or device (such as an RFID chip), affixed to the asset; 8) any actions taken by technician are logged into the tracking system or the data entry device (e.g., the selected option, the person performing the reconciliation, and timestamps); 9) the technician instructs the data entry device that the technician is done collecting data, when done; and 10) the data entry device communicates or transports the collected data to the tracking system.

As asset information is added, modified, and/or removed, the tracking system can display a sequence of these events in an event-viewer type environment. Such an event-viewer display if shown in FIG. 2, where pane 100 shows the recorded events, pane 110 shows asset information associated with any selected event, and pane 120 shows the transactional information related to the event such as the update-related information.

After an asset is updated within the tracking system, the tagged asset may also be updated. In order to update a tagged asset in the tracking system, the following preconditions and events, preferably take place: 1) preferably all data reconciliation is to be done with the tracking system; 2) the data entry device has a software application to collect key asset data; 3) the data entry device has a method to communicate with the tracking system (online/offline); 4) the asset is known by the tracking system and is tagged; 5) the tracking system has an entry for the asset, building, room, and rack which are all labeled with asset tags.

The events for updating a tagged asset within the tracking system preferably occur in the following sequence: 1) the technician enters the room with proper credentials; 2) the technician signs-in on to the data entry device with credential and is accepted; 3) the technician selects the room location; 4) the technician visually searches and finds the asset; 5) if asset data is updated manually, then the following manual data entry occurs: a) the technician scans the rack location with the data entry device where the asset was found, b) the technician enters the rack unit of the asset into the data entry device, c) the technician scans the asset tag with the data entry device, d) the technician enters additional data into data entry device (e.g., MAC, rack, RU, UPC, serial number, model, vender), preferably, as much data as available from the asset, 6) if necessary, the technician updates the status information for the asset; if the asset is being monitored, the asset status is all that need be updated; 7) any actions taken by technician are logged into the tracking system or data entry device (e.g., the selected option, the person performing the reconciliation, and timestamps); 8) the technician instructs the data entry device that the technician is done collecting data, when done; 10) the data entry device communicates or transports the collected data to the PIM asset tracking system.

After an asset is updated within the tracking system, the tagged asset may also be physically removed from a known location. In order to remove a tagged asset from a known location in the tracking system, the following preconditions and events, preferably take place: 1) preferably all data reconciliation is to be done using the tracking system, the remote server may or may not be up and running; 2) the data entry device has software application to collect key asset data; 3) the data entry device has a method to communicate with the tracking system (online/offline); 4) the asset is tagged and the location of the asset is known to tracking system; and 5) a report is available that lists the asset location (e.g. building, room, rack, RU, asset tag barcode); and 6) preferably all rooms within the data center are labeled with tags.

The events for physically removing a tagged asset from a known location preferably occur in the following sequence: 1) the technician enters the room with proper credentials; 2) the technician signs-in to the data entry device with credentials and the credentials are accepted; 3) the technician selects the location; 4) the technician uses the report to visually search for and find the tagged asset; 5) the technician verifies that the visually found asset matches what the report details; 6) the technician scans the asset tag with the data entry device; 7) the technician selects an option on the data entry device to assign the asset to the technician; 8) the technician physically removes the asset; 9) the asset status should now show Install/Move/Add/Change (IMAC); 10) any actions taken by the technician are logged into the tracking system or the data entry device (e.g., the selected option, the person performing the reconciliation, and timestamps); 11) the technician instructs data entry device that technician is done, when done; 10) the data entry device communicates or transports the collected data to the tracking system.

In order to install an asset into a specified location in the tracking system, the following preconditions and events, preferably take place: 1) all data reconciliation will be done with the tracking system; 2) the data entry device has a software application to collect key asset data; 3) the data entry device has a method to communicate with the tracking system (online/offline); 4) the asset is tagged and in the technicians possession (cart, hand, etc.); 5) a report is available that lists the desired location for the asset to be installed within the data center (e.g. building, room, rack, RU); 6) preferably, all rooms in the data center are labeled with tags.

The events for installing an asset into a specified location preferably occur in the following sequence: 1) the technician enters the room with proper credentials; 2) the technician signs-in to the data entry device with credentials and the credentials are accepted; 3) the technician selects the specified location with the data entry device; 4) the technician uses the report to visually search for the specified location; 5) the technician visually verifies that asset will fit in the specified location; 6) the technician scans the asset tag with the data entry device; 7) the technician enters asset new location data into data entry device (e.g., room, rack, RU) or scans the asset tag; 8) the technician installs the asset into the specified location; 9) any actions taken by technician are logged into the tracking system or the data entry device (e.g., the selected option, the person performing the reconciliation, and timestamps); 10) the technician instructs data entry device that technician is done, when done; and 11) the data entry device communicates or transports the collected data to the tracking system.

Figure 3:
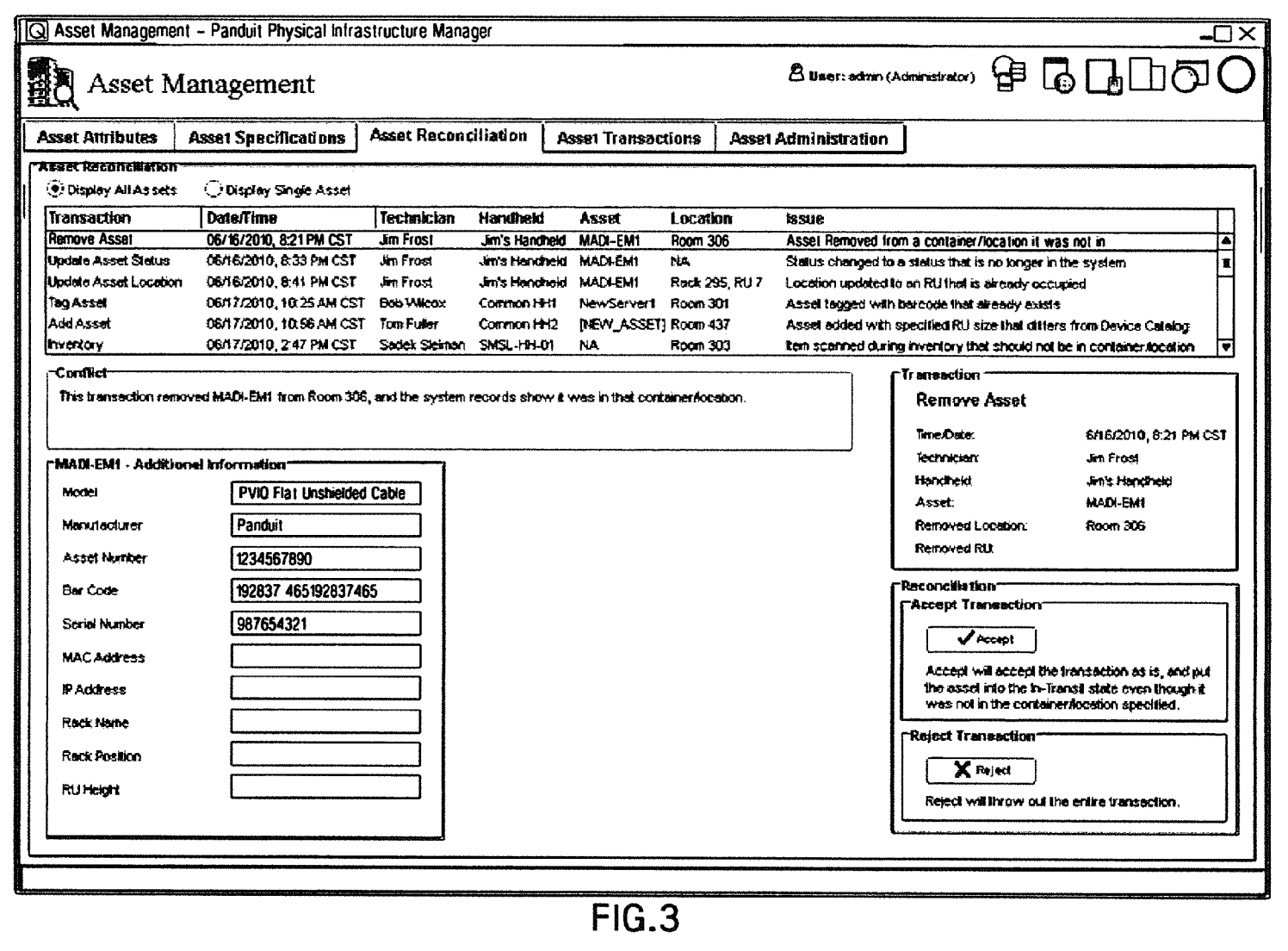

With reference to FIG. 3, in order to delete an asset from the tracking system, the following preconditions and events preferably take place: 1) preferably, all data reconciliation will be done with the tracking system; 2) the data entry device has a software application to modify key asset data; 3) the data entry device has a method to communicate with the tracking system (online/offline); 4) the asset is tagged; 5) the asset has been moved (via remove/install use cases) to a location in preparation for decommissioning; 6) preferably, all rooms in the data center are labeled with tags.

The events for deleting or decommissioning an asset from the tracking system preferably occur in the following sequence: 1) the technician enters the room with proper credentials; 2) the technician signs-in on to the data entry device with credentials and the credentials are accepted; 3) the technician scans the asset tag with the data entry device; 4) the technician validates that the asset matches the data in the tracking system; 5) the technician verifies if any special rules are defined for asset destruction; 6) the technician selects an option to delete the asset; 7) the technician scans his ID to confirm his/her identity; 8) preferably, any actions taken by technician are logged into the tracking system or the data entry device (e.g., the selected option, the person performing the reconciliation, and timestamps); 9) the technician instructs data entry device that technician is done, when done; 10) the data entry device communicates or transports the collected data to the tracking system.

Figure 4:
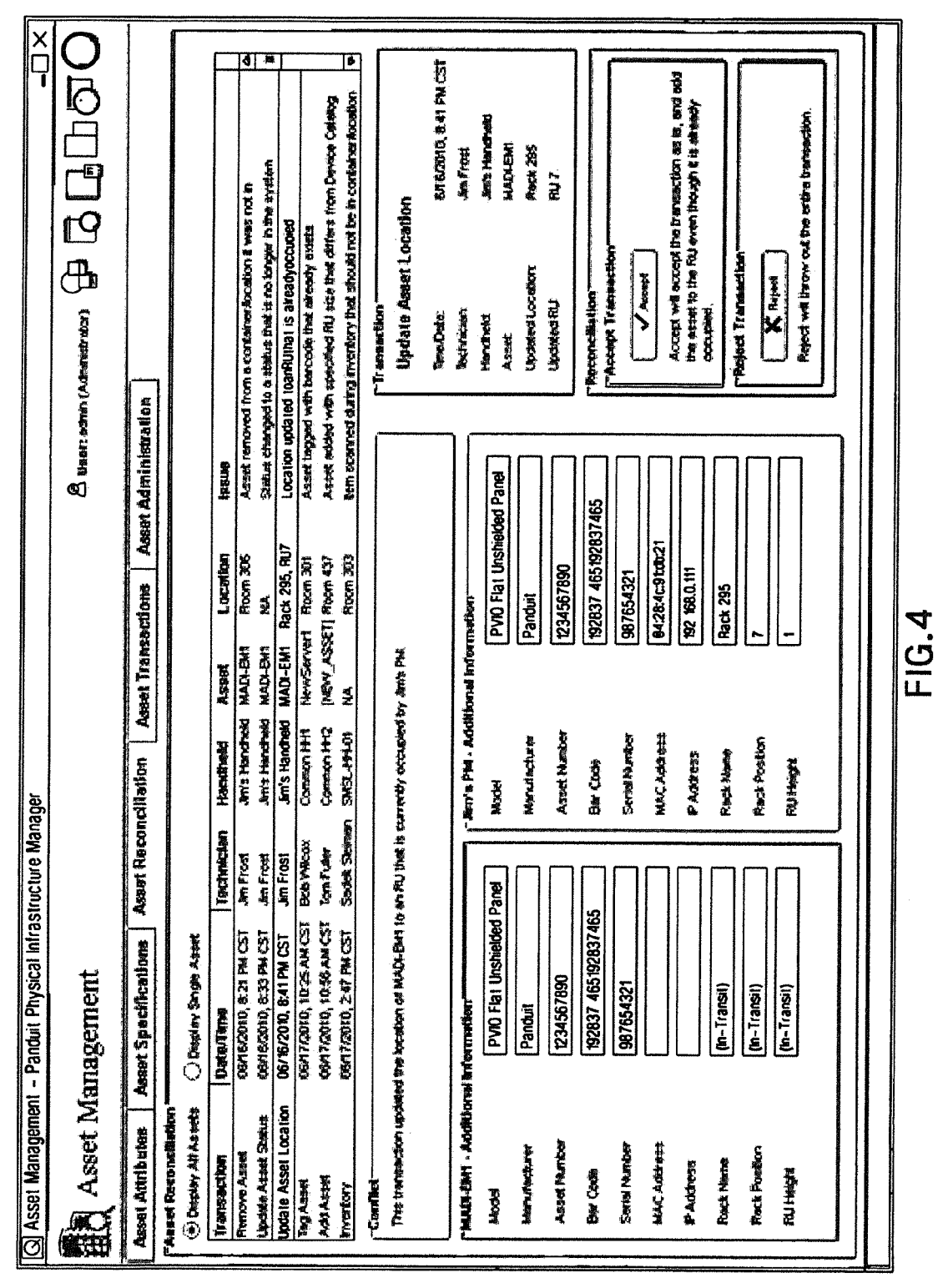

With reference to FIG. 4, when data gathered about off-network or on-network devices, such as the data entry device, is in conflict with the data in the tracking system, reconciliation of an asset record must occur. In order to reconcile an asset record, the following preconditions and events, preferably take place: 1) reconciliation is a manual process performed by the data center manager; 2) reconciliation may be initiated at the GUI for the tracking system or at the data entry device; 3) the reported device data is found to have the following problems but is not limited to: a) one or more (not all) of MAC address, asset number, EPC or barcode mismatch (data in the system doesn't match the reported MAC, asset number, EPC or barcode). Examples of records to be reconciled include: for a server with two NICs (network interface cards), existing system data lists one MAC; data entry device lists other MAC, b) a duplicate MAC, asset number, EPC (electronic product code) or barcode (another device in the system has the same reported MAC, asset number, EPC or barcode), c) the location in the system doesn't match the reported location for the same device or the device is missing in the system, d) a duplicate location (for example: another device in the system already occupies the reported location), and e) in a link-up report from the switches, the reported device is found in the system; 4) the technician is logged in with credentials that allows (all users will not have permission to perform reconciliation) reconciliation (on server or data entry device).

The events for reconciliation of an asset record in the tracking system preferably occur in the following sequence: 1) the tracking system (or the data entry device) logs the conflict and raises a security alert (e.g., generates a notification); 2) on the tracking system GUI (e.g., location tree) (or the data entry device), the asset with security alert is marked with special "visibility" for attention, indicating reconciliation is needed; 3) the technician selects the asset to be reconciled; 4) the technician is prompted for one of the following options by the system GUI or data entry device (e.g., on a drop down menu): a) edit the data field or selectively accept the conflicted data (the technician selects the data desired to be accepted) or b) accept new data for the device as is (the new device data will replace the existing device data).

If option a) is selected, the technician may manually edit additional data fields; the technician completes the change; the technician instructs the system or data entry device to accept the edited/accepted data; the reconciliation is complete and the security alert is cleared; and the asset returns to "normal" visibility within the tracking system. If option b) is selected, the reconciliation is complete and the security alert is cleared and the device returns to "normal" visibility.

A third option, option c) is also possible which is to reject and not accept the reported data (the existing device data is kept in the system and the reported data is discarded). If option c) is selected, the reconciliation is complete, the security alert is cleared, and the device returns to "normal" visibility. A fourth option, option d) is to defer, where the security alert is to be resolved by action other than manipulating the device data and existing device data is kept in the system. Under option d), reconciliation is still required, the device is still in security alert, and action other than manipulating the device data is required to complete the reconciliation. For example, a physical move of the device may be required to correct the problem.

After selecting an option in step 4), the sequence moves to step 5) whereby any actions taken by technician are logged into the tracking system or the data entry device (e.g., the selected option, the person performing the reconciliation, and timestamps).

In order to audit a specified location and verify expected inventory vs. actual inventory (e.g. for a SOx (Sarbanes-Oxley) audit), the following preconditions and events, preferably take place: 1) the tracking system has a list of known assets; 2) a report interface exists to generate reports by location (room, rack, etc.); 3) the report interface can print out the asset number and barcode number in barcode format; 4) at least one report is generated per location; 5) the report can be generated via paper or sent to the data entry device or displayed on the GUI of the tracking system.

The events for auditing a specified location and verifying expected inventory vs. actual inventory, preferably occur in the following sequence: 1) a report is generated that creates a location targeted listing (a room or a rack for example); 2) the report has an ID that can be scanned (e.g. bar code) for the asset number, the room and the location; 3) the technician enters the room with proper credential; 4) the technician signs-in on to the data entry device with credentials and the credentials are accepted; 5) the technician selects the room location with the data entry device; 6) the technician verifies that the technician is in the proper room; 7) the technician scans an asset tag and a barcode from the report that defines the location; 8) the technician scans, preferably, all assets associated with that location; 9) the technician indicates to the data entry device that all assets have been scanned; 10) actions taken by technician are logged into the system or data entry device (e.g., the selected option, the person performing the reconciliation, and timestamps); and 11) the technician closes out the transaction on the data entry device.

Figure 5:
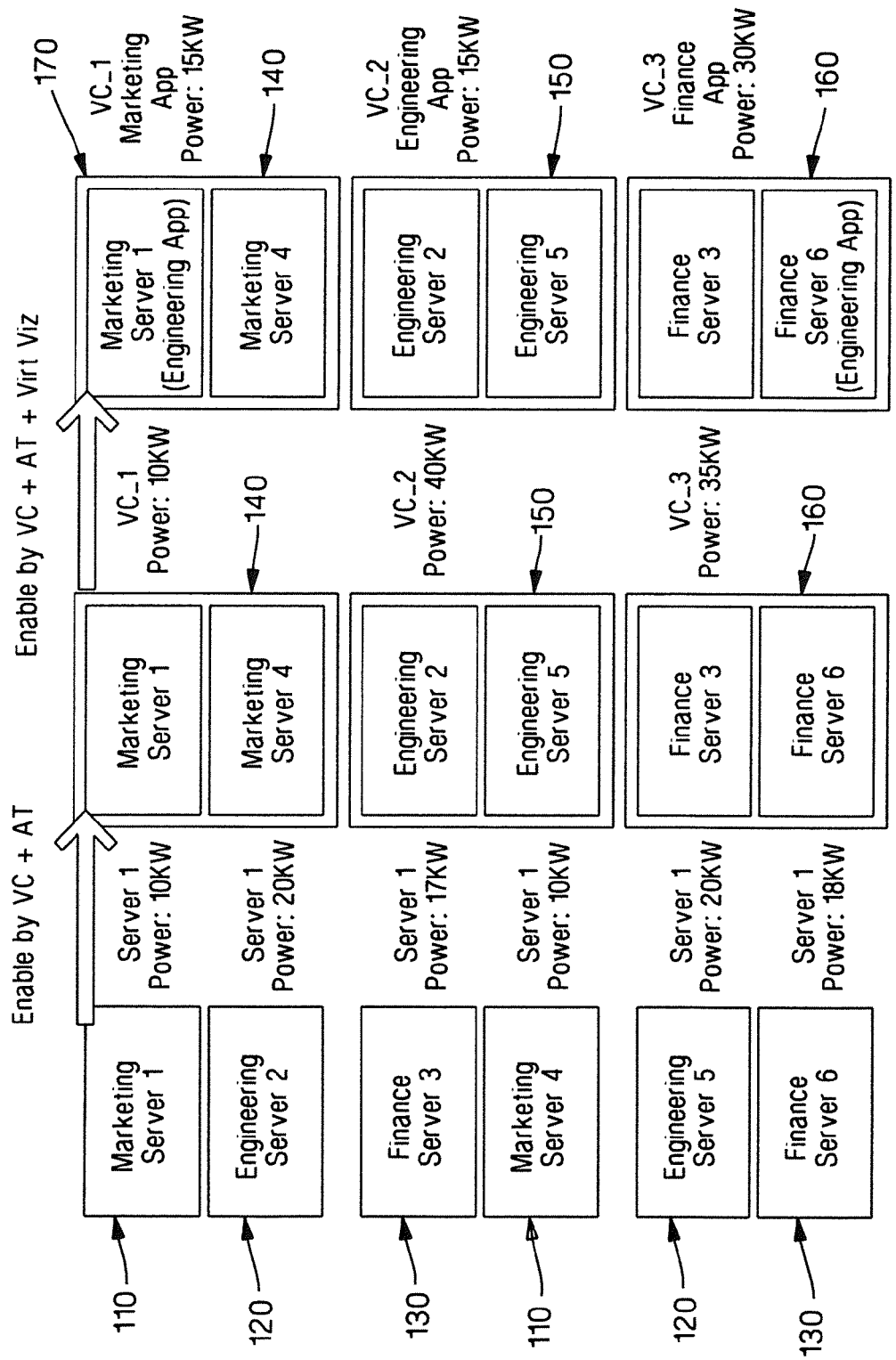
FIG. 5 depicts a flow chart illustrating how a virtual container allows for static and dynamic power aggregation for each monitored application when combined with virtualization visualization and an IMS asset tracking system.

With reference to FIG. 5, the virtual container feature provides the DCM with the ability to graphically represent the network equipment in a way that is desirable to the DCM. The graphical representation provided by the virtual container feature can provide a representation of the network equipment, for example by location, by equipment type, or by product line.

Data center managers and data center designers often refer to the assets in the data center in terms of their functional, logical, or physical grouping in the data center. The virtual container feature is targeted at that behavior. Within an IMS, assets may be referred to as managed items, which are items that are being managed by an IMS and are shown on a location tree. Managed items may include devices such as switches, Panduit's PViQ panels, POUs (power outlet units), DPEs, power-over-Ethernet panels, computers, other endpoints, and containers such as racks, as well as "virtual chassis," may all be managed items under an IMS. Assets known by the tracking system can be members of multiple virtual containers such as "POD 13", "Container 12", "Accounting Server group 3" and "Development Servers." The concept of a virtual container is a collection of customer defined items. The concept is defined such that a virtual container can contain other virtual containers. Also, a virtual chassis is defined as a "virtual container" under the physical network location tree that is intended to group related devices belonging to a Multi-NIC server, blade chassis server or switch. The virtual container leads to many useful applications: when combined with a virtualization visualization system and the tracking system, the virtual container is capable of determining power aggregation per application. Virtualization visualization gives a user the ability to visually model a network based on virtual containers. For example, there could be a diagram of all of the accounting department's servers in the network based on a virtual container. Also, the virtual container is able to set boundaries and rules for application accessibility running in a cloud computing environment. A cloud computing environment enables ubiquitous, convenient, on-demand network access to a shared pool of configurable computing resources (e.g., networks, servers, storage, applications, and services) that can be rapidly provisioned and released with minimal management effort or service provider interaction. Boundaries, such as geographical or security-based boundaries, may be enforced on an application, for example.

Preferably, the virtual container allows static and dynamic power aggregation per application when combined with a virtualization visualization system and the tracking system. This power aggregation functionality may enable enterprises to monitor the power usage of different departments. An example of such departments is illustrated in FIG. 5, showing marketing 110, engineering 120, finance 130, human resource (not shown), or research and development (not shown). For instance, all the above mentioned departments may have servers in any cabinet within a data center. By using the virtual container, a user can group all the marketing servers together 140, all the engineering servers together 150, all the finance servers together 160, and the same thing can be done to group other servers per department. Once this happens, with the help of the tracking system, a user can statically monitor the power usage by all or some of a particular group of servers, such as all of the marketing servers, with more ease. Furthermore, a user may also dynamically monitor the power usage by combining the virtual container with virtualization visualization. Virtualization visualization is able to dynamically track applications running by a certain department, such as the marketing department 170. When applications running from a certain department, such as the marketing department, interact with other departments, virtualization visualization is able to track them down and provide an accurate power per application data which can be generated dynamically.

The virtual container may enable the monitoring of VMware™ which is virtualization software for desktops manufactured by VMware of Palo Alto, Calif. The virtual container may track software based applications. The virtual container can show the user where an instance of an Oracle Database is running (e.g. on a server in another city) and provide and display how much processing power and memory is being consumed by that software, for example. For instance, a user can track how many instances of a certain type of software, such as Oracle Database software, is running and the user may also obtain the location of where the each instance of a certain type of software is running at. For example, virtual containers may be used to track all Microsoft Outlook applications in the network or how much memory is consumed by Microsoft Outlook for the accounting team, etc.

Figure 6:
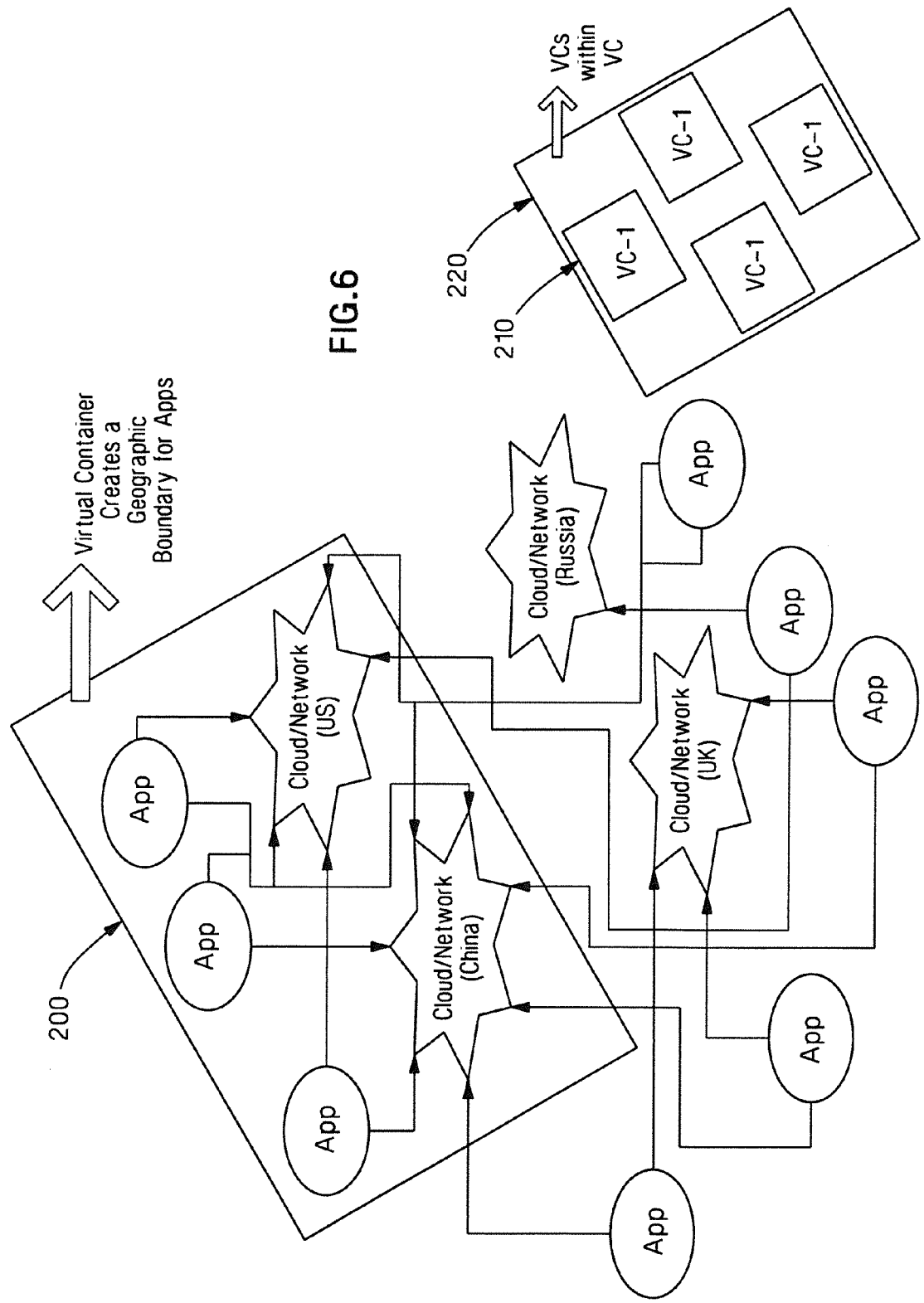
FIG. 6 depicts a flow chart illustrating a virtual container providing boundary and rules pertaining to application security when running in a cloud.

With reference to FIG. 6, the virtual container may provide boundary 200 and rules pertaining to application security when running in a cloud computing environment, known simply as a "cloud." A user may create a custom boundary and rules to limit the "traveling of an application." For instance, certain applications may be in a top secret or high level, and a user may use the virtual container to keep those applications on only certain approved servers. Applications may also be prevented from migrating to computing resources in particular locations.

Managed items 210 may easily be dragged and dropped into a virtual container 220 or chassis. Any time a managed item is dragged into a virtual container or chassis, the presence of the managed item under the network physical location tree should be left intact. Likewise, these managed items can also be copied or cut from a virtual location and be pasted onto another virtual location.

Figure 7:
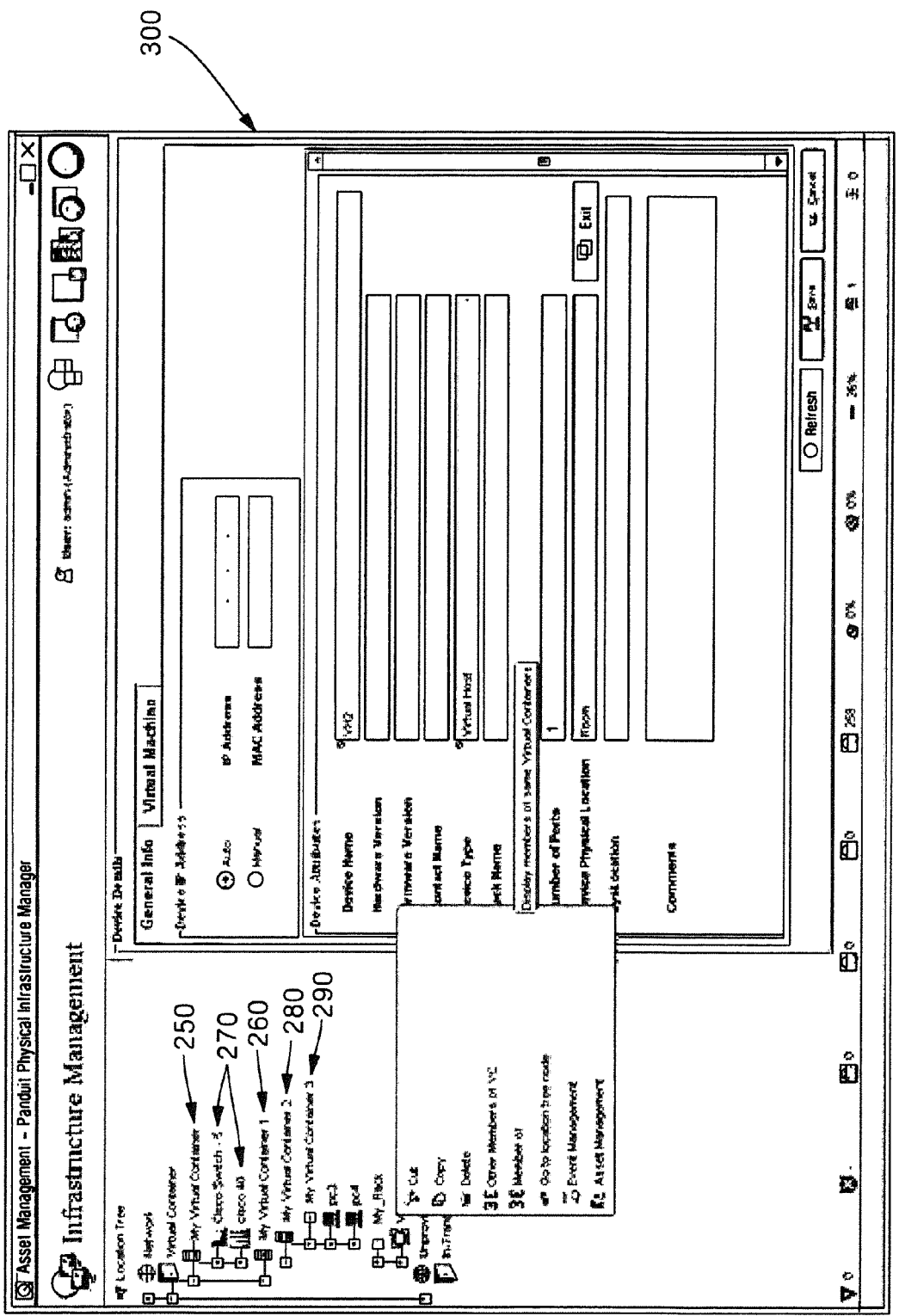
FIG. 7 depicts a Graphical User Interface (GUI) for a virtual container.

With reference to FIG. 7, two virtual containers are shown created under a root virtual container node. As an example the two virtual containers are named "My Virtual Container" 250 and "My Virtual Container 1" 260. Under "My Virtual Container," there are assets 270 being grouped together. This illustrates one of the main functions of a virtual container: to group assets into a user defined virtual container. Under "My Virtual Container 1," there are two virtual containers named "My Virtual Container 2" 280 and "My Virtual Container 3" 290 which belongs to "My Virtual Container 2." From this example, we can see that a virtual container is capable of grouping virtual containers within a virtual container. When a virtual container is selected or the assets within a virtual container are selected, a panel on the right-hand side 300 will display any appropriate information.

Figure 8:
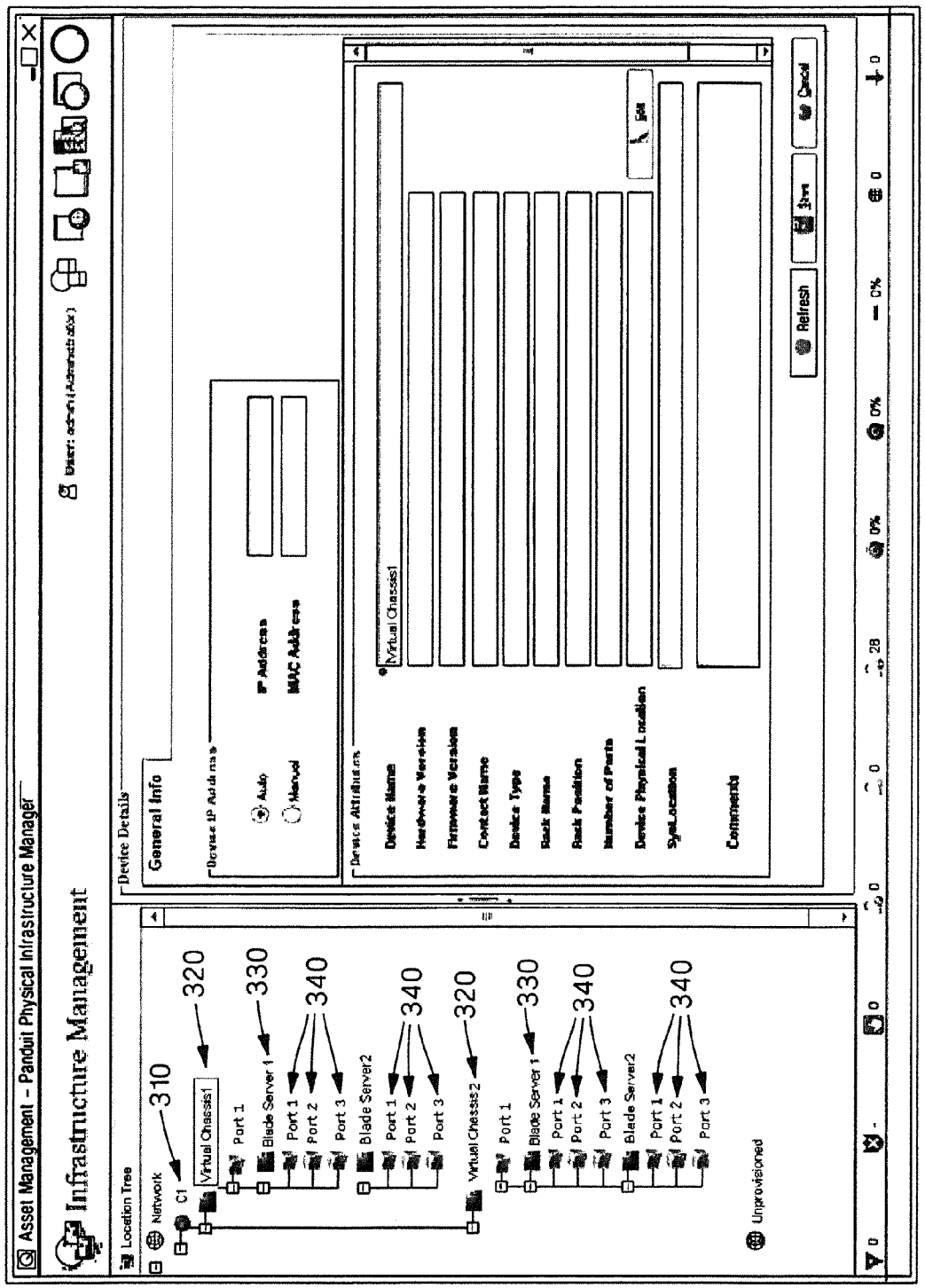
FIG. 8 depicts a GUI for a virtual chassis for a blade server.

With reference to FIG. 8, the hierarchy of a blade server virtual chassis is displayed as: Server 310-Virtual Chassis 320-Blade Server 330-Ports 340. A validation may be done to check what types the source and target devices are, e.g. switch and network capable devices. If the validation fails, then the user will be shown an error message. If the validation is successful, then the user will be shown a dialog box with an option to create a Multi-NIC device or a virtual chassis. If the user selects the virtual chassis option, a text box for entering the virtual chassis name will be displayed. If the user selects "Cancel" nothing will happen. If user selects "OK" then a new virtual chassis will be created and the source and target device would be shown under the newly created virtual chassis. When the user opens the connectivity for the virtual chassis, the connectivity view shows the ports for the underlying devices.

Figure 9:
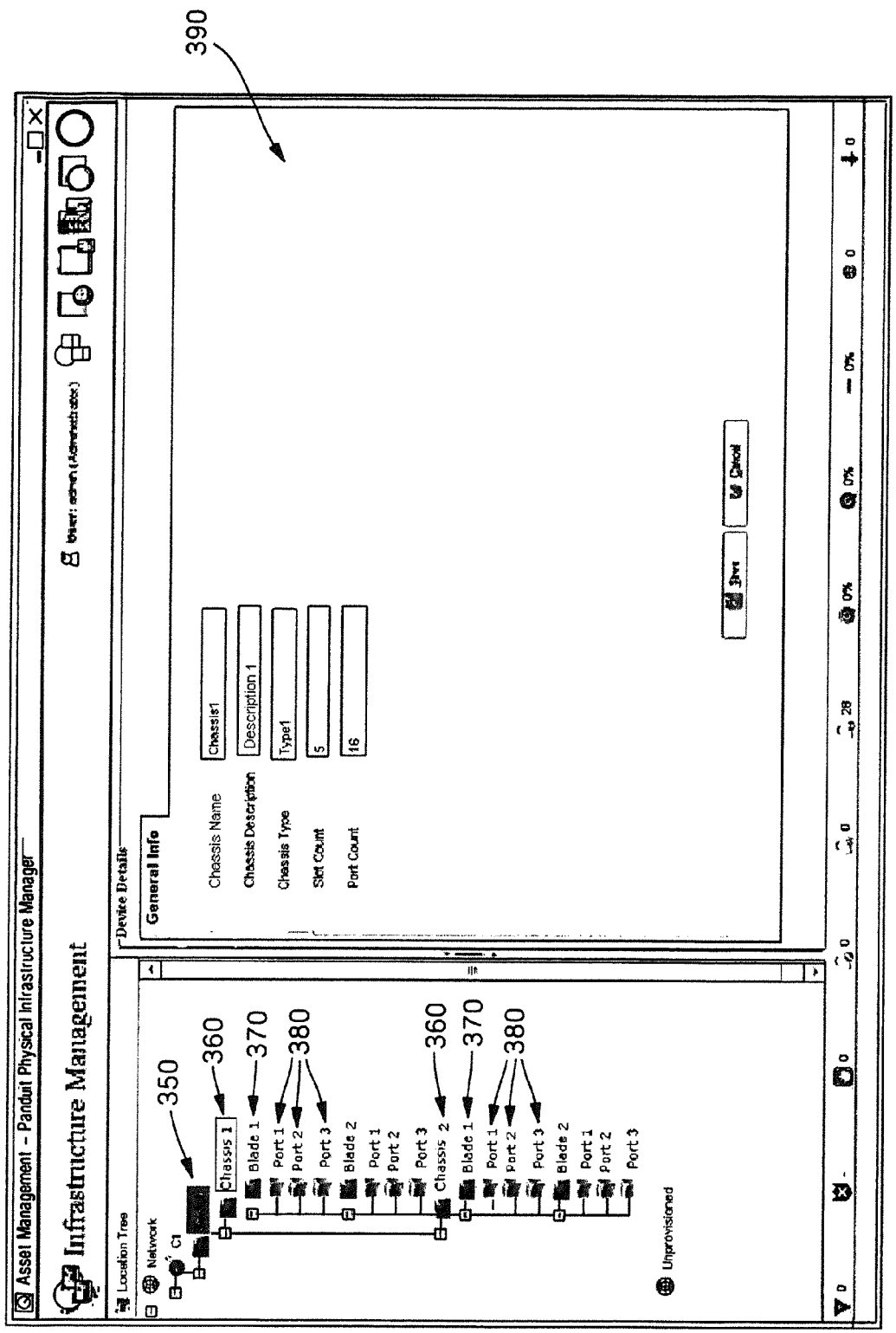
FIG. 9 depicts a GUI for a virtual chassis for a blade switch.

With reference to FIG. 9, a structure of a blade switch virtual chassis is displayed as: Switch 350-Chassis 360-Blade 370-Ports 380. When a user selects a virtual chassis, the chassis detail is displayed on the right-hand pane 390. Similarly when the user selects a switch blade under the virtual chassis, any blade details will be displayed on the right-hand pane 390.

Figure 10:
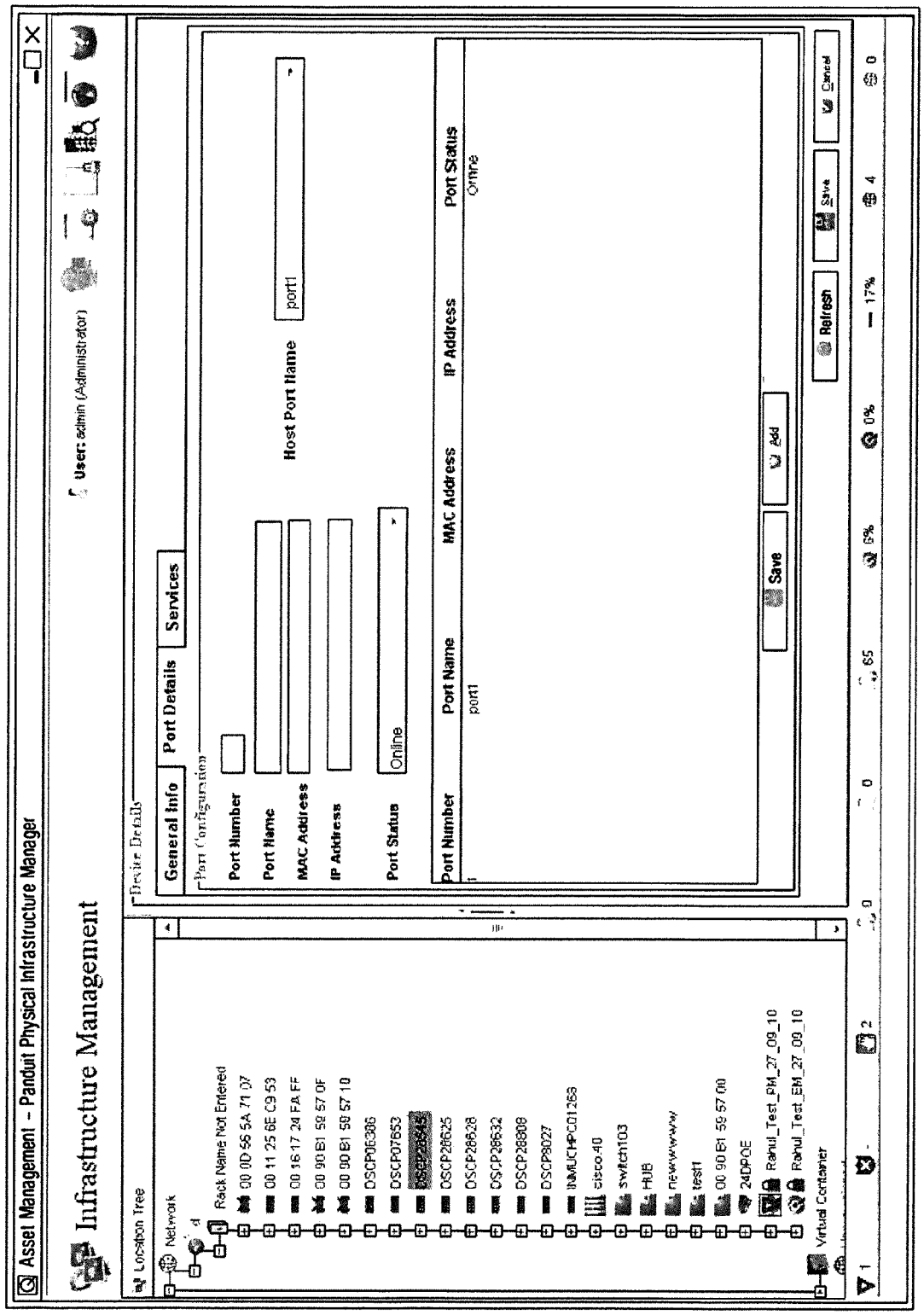
FIG. 10 depicts a GUI for a virtual chassis for a Multiple Network Interface Card (Multi-NIC) server.

With reference to FIG. 10, a validation may be done to check if source and target devices are e.g., switch and network capable devices, for example. If the validation fails then the user will be shown an error message. If the validation is successful, then the user will be shown a dialog box with an option to create a Multi-NIC device or a virtual chassis. If the user selects the Multi-NIC option and selects the OK button, a new port will be created for the target device with the IP and MAC of the source device. FIG. 10 displays the port details of a highlighted device.

Figure 11:
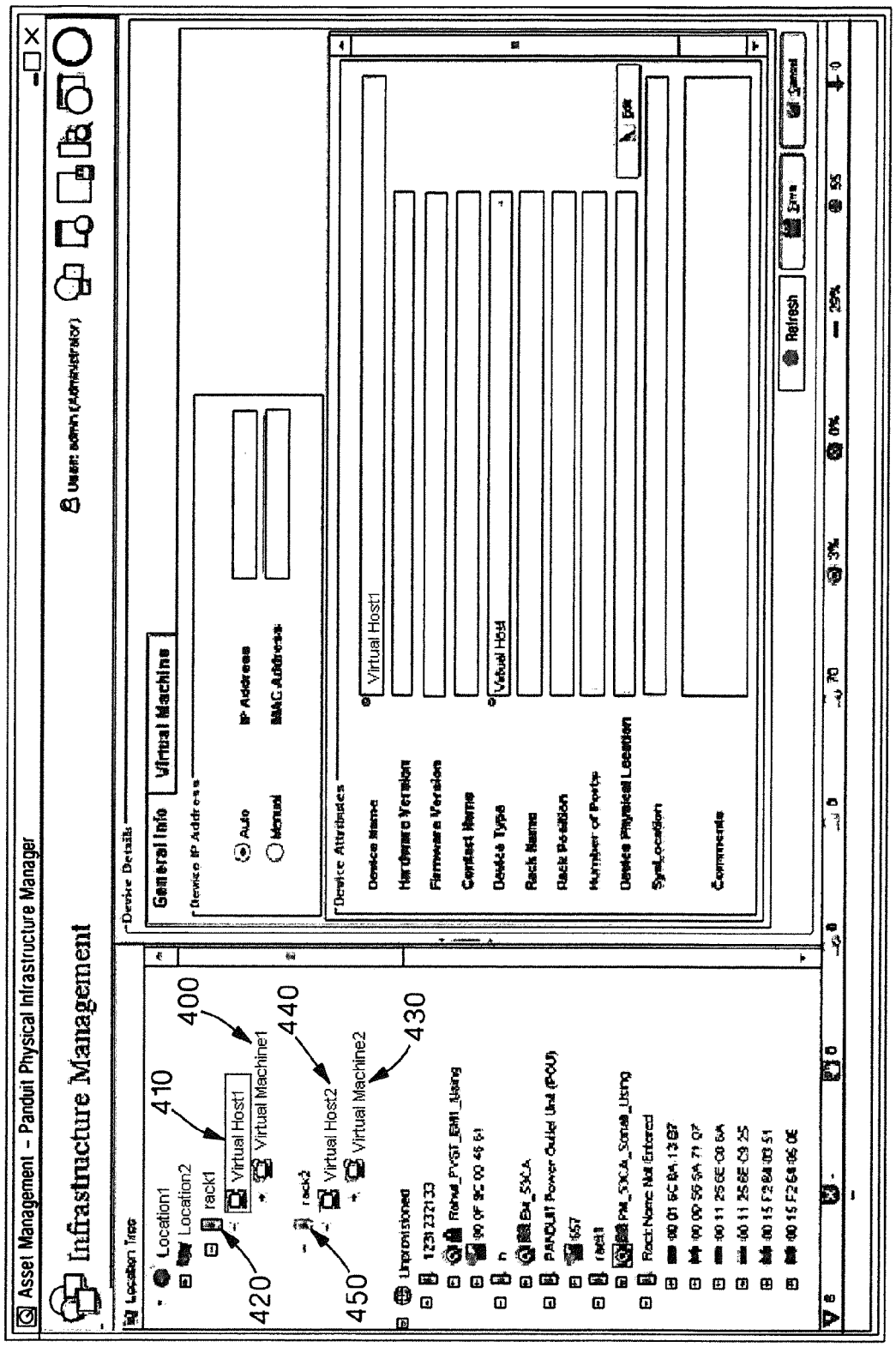
FIG. 11 depicts a GUI for a virtual host and virtual machine.

With reference to FIG. 11, one can observe the relationship between a virtual host and a virtual machine. For example, when viewing FIG. 11, one can observe that "Virtual Machine 1" 400 belongs to "Virtual Host 1" 410 in "rack 1" 420; and likewise, "Virtual Machine 2" 430 belongs to "Virtual Host 2" 440 in "rack 2" 450. Each virtual machine is associated with a virtual host and is represented as a child node of the virtual host.

Figure 12:
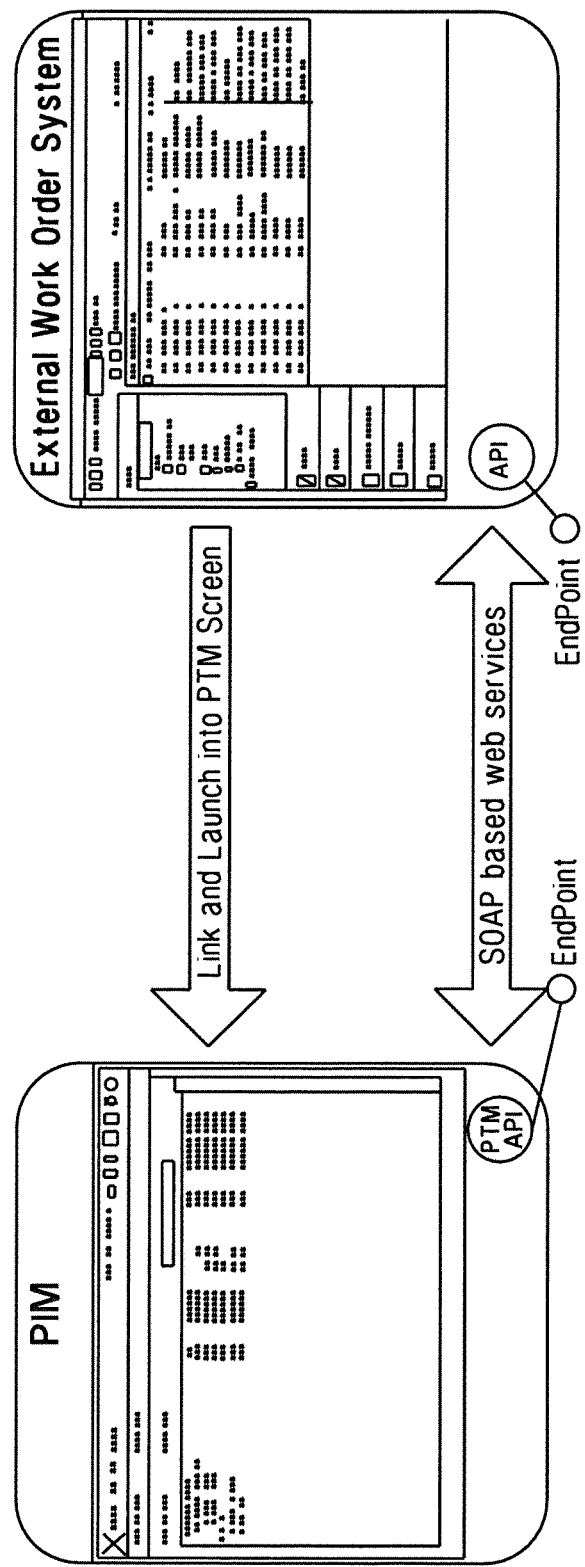
FIG. 12 depicts the interaction between an IMS task manager client and a third party system.
Figure 13:
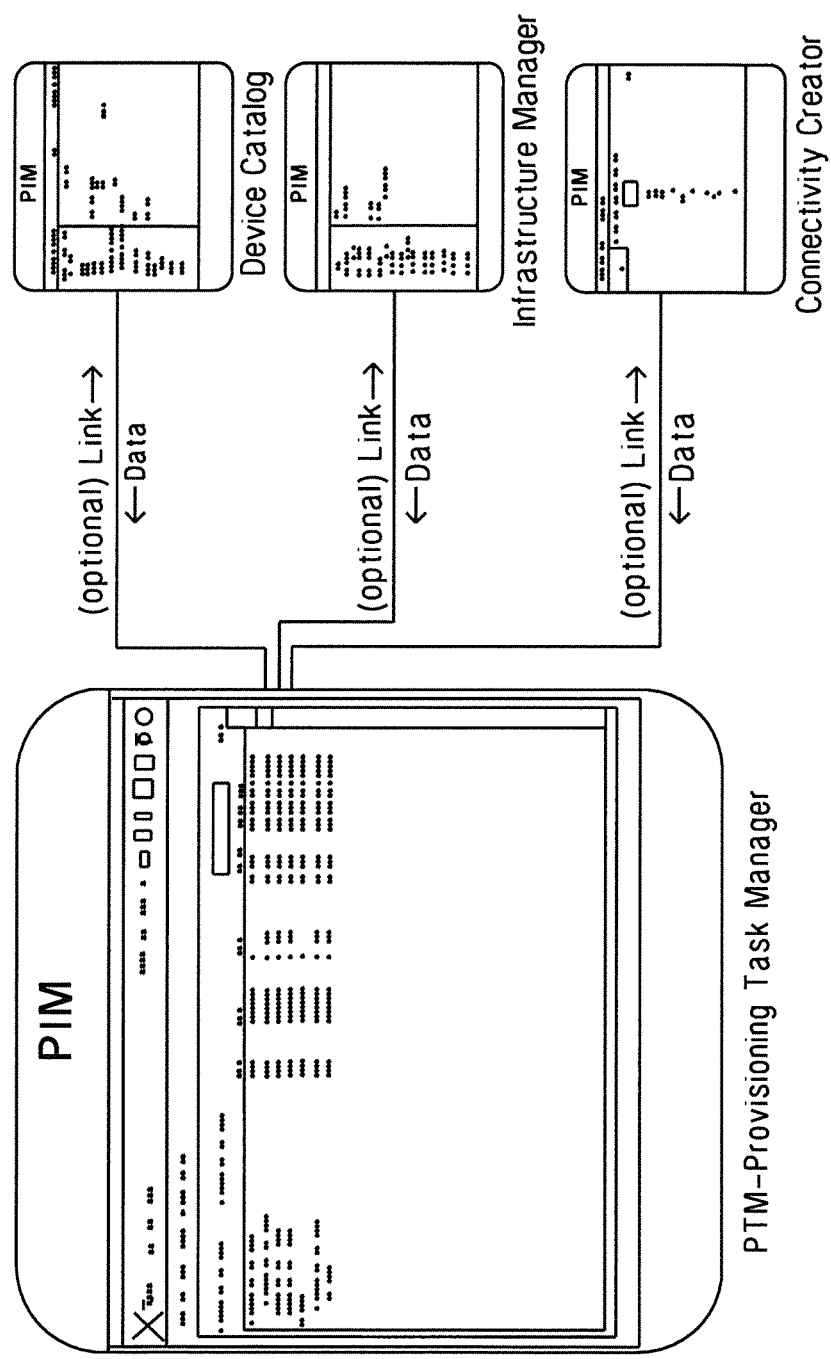
FIG. 13 depicts an IMS task manager and the addition of key data center information into a work order.

With reference to FIGS. 12 and 13, the IMS (in the case of the illustrations, the IMS is Panduit's PIM) task manager provides the DCM with the ability to view a work order task and to add subtasks to accomplish the work order task. DCMs routinely create and assign work order tasks to technicians to carry out the day to day operations of the data center. These tasks are typically include but are not limited to installing and removing equipment or assets such as switches, routers and servers from data center racks and cabinets. To simplify technician assignments and track the task from start to finish, DCM's use a third party work order application designed to do so. Examples of third party work order systems include BMC Remedy by BMC and Ground Zero Tech-Works Inc. by Ayallova.

The IMS Task Manager (ITM) feature provides the DCM the ability to view the work order tasks and to add subtasks to accomplish the work order task. The subtasks can be manual events that must be carried out, or they can be IMS related tasks that use existing IMS features like a Device Catalog, Infrastructure Manager, and Connectivity Creation Screens (available in Panduit's PIM software) to create detailed tasks that can be carried out by technicians or by an IMS automatically.

The ITM consists of three pieces: a third party work order system, an IMS, and an API (application programming interface) to connect the two. The third party work order system serves as the engine for creating and processing work orders. When a task on a work order is identified as an IMS related task, the task will be sent to the IMS, using API calls, for Data Center Manager and Network Engineer input. When a new work order task is received from the third party work order system, the IMS will store the task for processing, adding a timestamp. The DCM may then process the task within the IMS, creating any subtasks that are required at the IMS level. When finished, the updated task will be exported back to the third party work order system, which will add the subtasks into the work order. The IMS will then track the progress of the automatic subtasks and notify the third party work order system when a task is complete.

In one embodiment, only network connections will be processed by the IMS and a notification will be sent to the third party work order system. All other status updates will come down from the third party work order system.

One primary method for accessing and provisioning the tasks will be handled by a link on the third party work order system. This link will open an IMS client and take the user to a ITM landing page. This landing page will display the work orders for that user and will allow the provisioning of tasks for the work orders. The IMS allows a user to save a device, location or connection (connect/disconnect) to a task. The necessary information required to do the task will be placed in the task.

The ITM displays a main page which provides links to a device catalog, an infrastructure manager, and a connectivity creation page, allowing for easy access to areas for finding devices, locations, and connections. The selected device information, location, and connection information may be added into a task that is being configured when the user saves the selection to the task.

As a result, the IMS seamlessly integrates with the 3rd party system (that is, it appears to be a part of the 3rd party work order system when using the 3rd party work order system). Additionally, the ITM allows extension and enhancement of the 3rd party functionality in a unique manner. The IMS provides the ability to define connectivity, RU Reservation, POU outlet reservation and asset tagging work order subtasks. As the subtasks are defined using IMS features, they are transferred to a ITM holding container module. Once subtasks are encapsulated in the ITM holding container module they can be reordered/deleted/added/modified as a part of the overall work order within the 3rd party work order system. Work orders are normally initiated from the 3rd party work order system, however, the IMS can have the capability of initiating a work order and transfer that set of tasks/subtasks to the 3rd party system.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the invention have been described, it will be apparent to those of ordinary skill in the art that other embodiments and implementations are possible within the scope of the invention. Accordingly, the invention is not to be restricted except in light of the attached claims and their equivalents.

We claim:

1. An asset tracking system for tracking assets within a data center, said asset tracking system comprising:
    a processor coupled to a memory executing an infrastructure management software;
    a task manager providing a list of work order tasks, each of said work order tasks being associated with at least one of adding a new asset, updating a newly discovered asset, updating a tagged asset, installing an asset, and removing an asset; and
    a virtual container providing a graphical representation of a network at least partially connected to said data center,
    said asset tracking system recording, tracking, and managing information associated with equipment, within said data center, that is not connected to said network, via at least one identification tag placed on said equipment and at least one data entry device capable of gathering information from said at least one identification tag, wherein said identification tag includes at least one of a radio frequency identification tag and a bar code tag, and wherein said data entry device includes at least one of a radio frequency identification tag scanner and a bar code tag scanner,
    said asset tracking system further comprises an asset tracking reconciliation.

2. The asset tracking system of claim 1, wherein said virtual container determines power aggregation for at least one application executed on at least one server.

3. The asset tracking system of claim 2, wherein said virtual container determines power aggregation for all applications associated with at least one department.

4. The asset tracking system of claim 1, wherein said virtual container sets security boundaries for applications executed on servers virtually placed within said virtual container.

5. The asset tracking system of claim 1, wherein said virtual container sets security boundaries for all applications placed within said virtual container.

6. The asset tracking system of claim 1 further comprising an application programming interface (API), said API connecting said infrastructure management software and a third party application.

7. The asset tracking system of claim 6, wherein said third party application is a work order system capable of creating and processing work orders for said data center.

8. The asset tracking system of claim 1, wherein said asset tracking reconciliation includes:
    a manual reconciliation;
    a automatic reconciliation;

a reconciliation rejection; and a reconciliation deferral.

9. The asset tracking system of claim 8, wherein said manual reconciliation are achieved by human interaction, and said automatic reconciliation are achieved without human interaction.

\* \* \* \* \*